May 24, 1932.    F. W. ROLLER    1,860,056
ELECTRICAL MEASURING INSTRUMENT
Filed Dec. 31, 1929
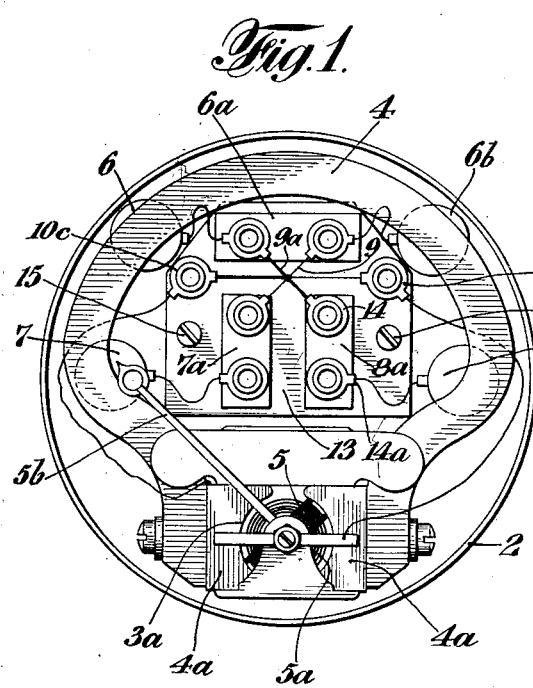
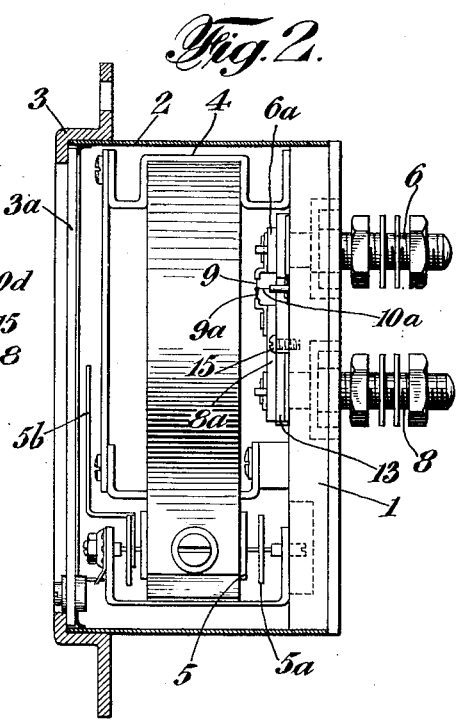
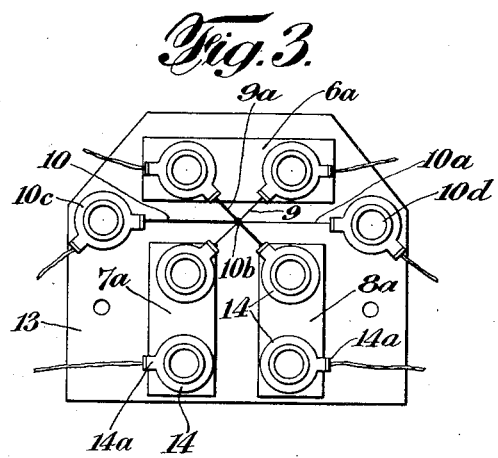
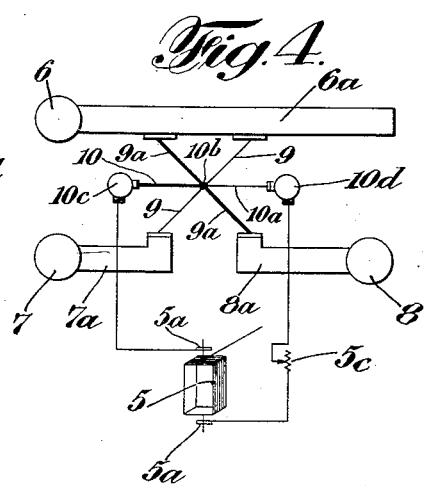
INVENTOR
Frank W. Roller
BY
Lawrence K. Sager
his ATTORNEY Patented May 24, 1932

1,860,056

UNITED STATES PATENT OFFICE

FRANK W. ROLLER, OF EAST ORANGE, NEW JERSEY, ASSIGNOR TO ROLLER-SMITH COMPANY, A CORPORATION OF NEW YORK

ELECTRICAL MEASURING INSTRUMENT

Application filed December 31, 1929. Serial No. 417,619.

This invention relates to instruments which are particularly adaptable for use in measuring alternating currents of high frequency, although the invention is also applicable for use in measuring alternating currents which do not have high frequencies, as well as to the measurement of direct currents.

The type of instrument to which this invention relates is one wherein a conductor is heated by the passage of the current therethrough and a thermo-electric couple is provided for securing an indication of the current to be measured.

In my application executed on December 19, 1929, filed December 30, 1929, Serial Number 417,390, I have disclosed one form of improved instrument of this type, the said application containing the broader claims.

One of the main objects of the present invention is to provide an instrument of the above type which may have double range scale indications for convenience in measuring currents of comparatively high and low values with adequate deflection of the instrument indicator. Another object is to provide an instrument of this type which will have such a high degree of accuracy as to satisfactorily comply with the requirements in this regard. Another object is to provide a simple form of construction, and one which may be conveniently and economically manufactured and assembled. Another object is to provide, in this type of instrument, double range scale indications by a form of construction in which only one thermo-electric couple is required. Other objects and advantages will be understood from the following description and accompanying drawings which illustrate a preferred embodiment of this invention.

Fig. 1 is a front view of the instrument with the scale plate and front cover removed; Fig. 2 is a side view, partly in section; Fig. 3 is a front view of the removable unit; and Fig. 4 is a diagram of connections.

Referring to Figs. 1 and 2, the indicating instrument is shown as having a base 1, a cylindrical casing 2 secured thereto and a front cover 3 having an outwardly extending flange for supporting the instrument on a panel. The cover 3 has an opening which is closed by a glass plate 3a. The indicating portion of the instrument may be of any suitable direct current type and is here shown as having a permanent magnet 4 of generally circular form, provided with pole pieces 4a, between which is located the pivotally supported movable coil 5, having the usual springs 5a for opposing the deflection of the movable element. The movable element carries, of course, the indicating needle or pointer 5b. The instrument as thus far described may be of any particular design or form of construction for giving a deflection of the indicating element upon being subjected to an electro-motive force producing a direct current in the instrument.

Thermo couple instruments are well-known and include a conductor or strip which is heated by the passage of the current to be measured, and the thermo couple has its junction of the two dissimilar metals heated corresponding to the heating of the conductor or strip by the current to be measured. The electro-motive force generated by the thermo couple, when applied to a suitable direct current indicating instrument, will give a proper indication of the current to be measured passing through the heating conductor or strip. It is very desirable, particularly in the measurement of alternating currents, to provide a two-range instrument having a double scale, one for indicating the value of comparatively large currents, and the other for indicating the value of smaller currents, with a possible maximum deflection when measuring smaller currents, equal or approximately equal to the possible maximum deflection in the measurement of large currents. Two-range instruments are usually provided with a common terminal to which one lead is connected, one terminal for connection of the remaining lead from the circuit in which the current is to be measured for the measurement of large currents, and a third terminal for connection of this lead when currents of lower value are to be measured. The present invention provides a two-range thermo couple instrument which has the convenience of a common terminal and two other terminals for alternate connection, according to whether the current to be measured is high, or low.

Referring to Fig. 4, the common terminal 6 is indicated as in electrical connection with a conducting bar 6a. The terminal 7 is indicated electrically connected to a conducting bar 7a, and may be the terminal to which the external circuit is connected for measurement of low currents; while the terminal 8 is shown connected to a conducting bar 8a, being the terminal to which the external circuit may be connected for the measurement of large currents. Electrically connected between the bars 6a and 7a is a conductor or strip 9 of comparatively small size, which is the heating strip for carrying the current to be measured for currents of low value. Electrically connected between the bars 6a and 8a is another conductor or strip 9a of larger size, or larger current carrying capacity, which is the heating strip for the measurement of currents of larger values, this conductor being indicated by a heavier line than that indicating the conductor 9. The heating conductors 9 and 9a are shown crossing each other at approximately their mid-points and are electrically insulated from each other where they cross, although in some cases, electrical insulation may be omitted.

In Fig. 4 a thermo couple of dissimilar metals is indicated by the heavy and light lines 10 and 10a, having their heated joint in thermal relationship to both the heating conductor 9 and the heating conductor 9a, but electrically insulated therefrom, although in some cases, the electrical insulation may be omitted. That is, the joint of the thermo couple to be heated is in such thermal relationship to the heating conductors 9 and 9a that it is quickly responsive to any change in temperature in each of these conductors. I have found that this thermal relationship and electrical insulation may be accomplished by use of enamel, such as vitreous enamel, which will serve as an insulator of the joint of the couple from the two heating conductors with a thin film thereof between the couple and the heating conductors and with a thin film thereof between the two heating conductors, when electrical insulation is used or desired, while at the same time there is secured by this means intimate conductive heating relationship between the joint of the couple and each of the two heating conductors. In accomplishing this intimate relationship while securing electrical insulation, the enamel material is introduced at the junction of the parts and between them and then fused at the required temperature. This enamel insulation between the joint of the thermo couple and the heating conductors and between the two heating conductors is indicated by the reference character 10b. Any other suitable means may be utilized for securing intimate thermal relationship between the joint of the thermo couple and the heating conductors, and which will also serve to electrically insulate the joint of the couple from the heating conductors and each of the heating conductors from the other.

The terminals 10c and 10d of the thermo couple are connected to leads extending to the springs 5a and thence through the coil 5 of the indicating instrument. An adjustable resistance 5c is shown connected in series with the circuit of the movable coil 5 and with the thermo couple for adjustment of the current for securing proper deflection of the movable element, this resistance, of course, remaining fixed after being suitably adjusted. It is evident that it will take a larger current through the larger heating conductor 9a to heat it to the same temperature as that attained by the smaller heating conductor upon the passage therethrough of a smaller current. Thus when the instrument is used alternatively for the measurement of comparatively small or large currents, the extent of deflection of the instrument pointer over the double scale depends upon whether the external circuit is connected to terminal 7, or 8.

In Figs. 1 to 3, the parts corresponding to those already described, are designated by the same reference characters. The common terminal 6 is indicated as passing through the base of the instrument for conveniently receiving connection with the outside circuit in which the current is to be measured; and similarly the electrical terminals 7 and 8 are mounted upon the base 1 and extend at the rear thereof for connection to the outside circuit.

Instead of having the terminals 6, 7 and 8 mounted directly upon the connecting bars or plates to which the heating strips are connected, I have separated the main terminals therefrom and have provided a unitary structure comprising the conducting bars or plates, and also the heating elements and thermo couple. And, I have made this unitary structure as a separately removable and replaceable unit for convenience in manufacture, assembling and repair or replacement of the parts, as disclosed in my other application. This separately removable structure comprises a main supporting plate 13 of suitable insulating material, such as bakelite or the like. This insulating plate has mounted thereon the conducting bars 6a, 7a and 8a, which are in the form of metal plates provided with terminals in the form of rings 14 having projections 14a, to which conductors may be connected. These rings are preferably made of copper and are riveted, or otherwise secured, to the metal plates. A pair of similar rings forming the terminals 10c and 10d are mounted upon the insulating plate 13, between which is connected the thermo couple. The two heating conductors 9 and 9a are connected between terminals on the three plates crossing each other, as shown in Figs. 1 and 3. The insulating plate 13 is removably secured to the base of plate 1 by a pair of screws 15.

When this removable unit is mounted in the instrument, the left-hand terminal on the plate 6a is electrically connected by a conductor, as indicated in Fig. 1, to the terminal 6. The lower two terminals on the plates 7a and 8a are respectively connected to the terminals 7 and 8. The terminals 10c and 10d are connected in circuit with the movable coil 5 of the instrument. Thus, by merely unsoldering the connections to the terminals carried by the removable unit, the unit may be conveniently removed, repaired and adjusted, and when replaced, it is merely necessary to again solder the connections. This removable unit comprising the heating conductors, thermo couple, conducting plates, terminals and insulating support may be very desirably used in other forms of thermo couple instruments, other than that particularly shown and described herein.

In using the instrument, when the external circuit is connected to the common terminal 6 and the terminal 8 for measurement of currents of comparatively large values, it is apparent that the conductor 9a will then function as the heating conductor and that the thermo couple will create an electro-motive force corresponding to the value of the current to be measured, giving corresponding deflection of the indicating element of the instrument. Similarly, when the external circuit is connected between the terminal 6 and the terminal 7, the conductor 9 functions as the heating element and the thermo couple serves to create an electro-motive force in the instrument circuit corresponding to the current to be measured. It is apparent that when using the instrument, the circuit of the instrument carrying the current causing the deflection, contains no path for the passage of any portion of the current to be measured, and is not subjected to the effects of such current except the heating for the measurement thereof, even though the thermo couple junction be not electrically insulated from the heating conductors, and even though the heating conductors be not electrically insulated from each other.

It is apparent that the thermo couple joint may be in electrical connection with one of the two heating conductors without affecting the operation of the instrument. In some cases, the two heating conductors at their point of crossing may be electrically connected and the joint of the thermo couple may be also electrically connected to the two heating conductors at the junction. When the two heating conductors are electrically connected at their point of crossing, the portions of the two conductors connected to the plate or bar 6a both serve to conduct the current to be measured when the external circuit is connected to either terminal 7 or terminal 8; but the portions of the heating conductors beyond their point of crossing and which are connected to the plates or bars 7a and 8a, will serve as heating portions respectively, according to whether the external circuit is connected to the terminal 7 or to the terminal 8, the same as if the heating conductors were not electrically connected at their point of crossing. Under these conditions, the portion of the heating conductors connected to the plate or bar 6a leading to the point of crossing may be merged into a single conductor, if desired. By properly dimensioning the parts as to cross-section and length of the heating conductors and calibration of the instrument, the readings obtained from the two scales of the instrument will give sufficiently accurate indications of current values, even though the heating conductors are electrically connected at their point of crossing. It will be understood that more than two heating conductors may be used between the conducting plates or bars crossing each other at a common point and with a thermo couple having its junction in thermal relationship to the conductors at their point of crossing, when it is desired to secure more than two ranges of measurement with the instrument.

Although I have described a preferred embodiment of this invention, it will be understood that modifications thereof may be made without departing from the scope thereof.

I claim:

1. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said conductors having certain portions only thereof in thermal relationship to each other, a thermo-electric couple of dissimilar metals having one junction of such metals in thermal relationship to both of said conductors, and means for indicating the electro-motive force generated by said couple.

2. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said conductors having mid portions only thereof in thermal relationship to each other, a thermo-electric couple of dissimilar metals having one junction of such metals in thermal relationship to said mid portions of said conductors, and means for indicating the electro-motive force generated by said couple.

3. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors crossing each other at portions thereof, a thermo-electric couple of dissimilar metals having the junction of such metals in thermal relationship to the crossing portions of said conductors, and means for indicating the electro-motive force generated by said couple.

4. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors having portions thereof in thermal relationship to each other, said conductors being electrically insulated from each other at said region of thermal relationship, a thermo-electric couple of dissimilar metals having the junction of such metals in thermal relationship to said conductors at said region of thermal relationship, and means for indicating the electro-motive force generated by said couple.

5. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors having portions thereof in thermal relationship to each other, said conductors being electrically insulated from each other at said region of thermal relationship, a thermo-electric couple of dissimilar metals having the junction of such metals in thermal relationship to said conductors at said region of thermal relationship, said thermo-electric couple being electrically insulated from at least one of said heating conductors, and means for indicating the electro-motive force generated by said couple.

6. In an electrical measuring instrument, a conducting element for connection to one lead of an external circuit, a pair of conducting elements for alternate connection to the other lead of the external circuit, heating conductors connected between said first named element and said other elements respectively and having portions thereof in thermal relationship to each other, a thermo-electric couple having its junction in thermal relationship to said portions, and means for indicating the electro-motive force generated by said couple.

7. An electrical measuring instrument comprising a base and an enclosing casing, a plurality of terminals mounted on said base forming terminals within and without said base, indicating means mounted upon said base, and a separately removable unit mounted upon said base, said unit comprising an insulating support, a common conducting element mounted on said support, a pair of conducting elements mounted on said support at one side of said common conducting element, a pair of heating conductors electrically connected between said common conducting element and said pair of elements respectively, said heating conductors having portions thereof in thermal relationship to each other, and a thermo-electric couple having its junction in thermal relationship to said portions.

8. In an electrical measuring instrument, a plurality of terminals for connection to an external circuit, a heating conductor electrically connected between certain of said terminals, a second heating conductor electrically connected between certain of said terminals, at least one of which is a different terminal from those to which said first heating conductor is connected, said heating conductors being of different current carrying capacity and having portions thereof in thermal relationship to each other, a thermo-electric couple of dissimilar metals having one junction of such metals in thermal relationship to both of said conductors, and means for indicating the electro-motive force generated by said couple.

FRANK W. ROLLER.